United States Patent [19]
Schmitt et al.

[11] Patent Number: 4,943,265
[45] Date of Patent: Jul. 24, 1990

[54] DEVICE FOR TRANSMITTING AN ADJUSTABLE POSITION OF A DRIVEBELT PULLEY IN A CONTINUALLY VARIABLE TRANSMISSION

[75] Inventors: Holm Schmitt, Cologne; Fritz Henken, Langwedel; Hartmut Röper, Monheim; Peter Heider, Euskirchen, all of Fed. Rep. of Germany

[73] Assignee: Ford Motor Company, Dearborn, Mich.

[21] Appl. No.: 380,420

[22] Filed: Jul. 17, 1989

[30] Foreign Application Priority Data

Aug. 13, 1988 [DE] Fed. Rep. of Germany ....... 3827543

[51] Int. Cl.⁵ .............................................. F16H 9/00
[52] U.S. Cl. ........................................ 474/25; 474/28
[58] Field of Search ...................... 474/11, 12, 17–21, 474/28, 69, 70, 101; 74/865–869

[56] References Cited
U.S. PATENT DOCUMENTS 4,680,991  7/1987  Miyawaki ........................... 47/28 X

FOREIGN PATENT DOCUMENTS 0158370  1/1985  European Pat. Off. .
1530775  10/1963  Fed. Rep. of Germany .

Primary Examiner—Thuy M. Bui
Attorney, Agent, or Firm—Frank G. McKenzie; Donald J. Harrington

[57] ABSTRACT

A device for transmitting the position of a drivebelt pulley of a continually variable automatic transmission to a valve arrangement includes a lever assembly extending between the valve and a variable displacement abutment connected to a sensor foot contacting the pulley. The position of the sensor foot is displaceable on an axial guide rod according to the position of a threaded bushing. The position of the pedal is adjustable from outside the transmission housing by rotating a tool that turns a setting sleeve rotatably fixed to the guide rod. As the guide rod turns, the bushing, engaged with threads on the sensor foot, changes the position of the abutment contacted by the lever assembly.

7 Claims, 1 Drawing Sheet

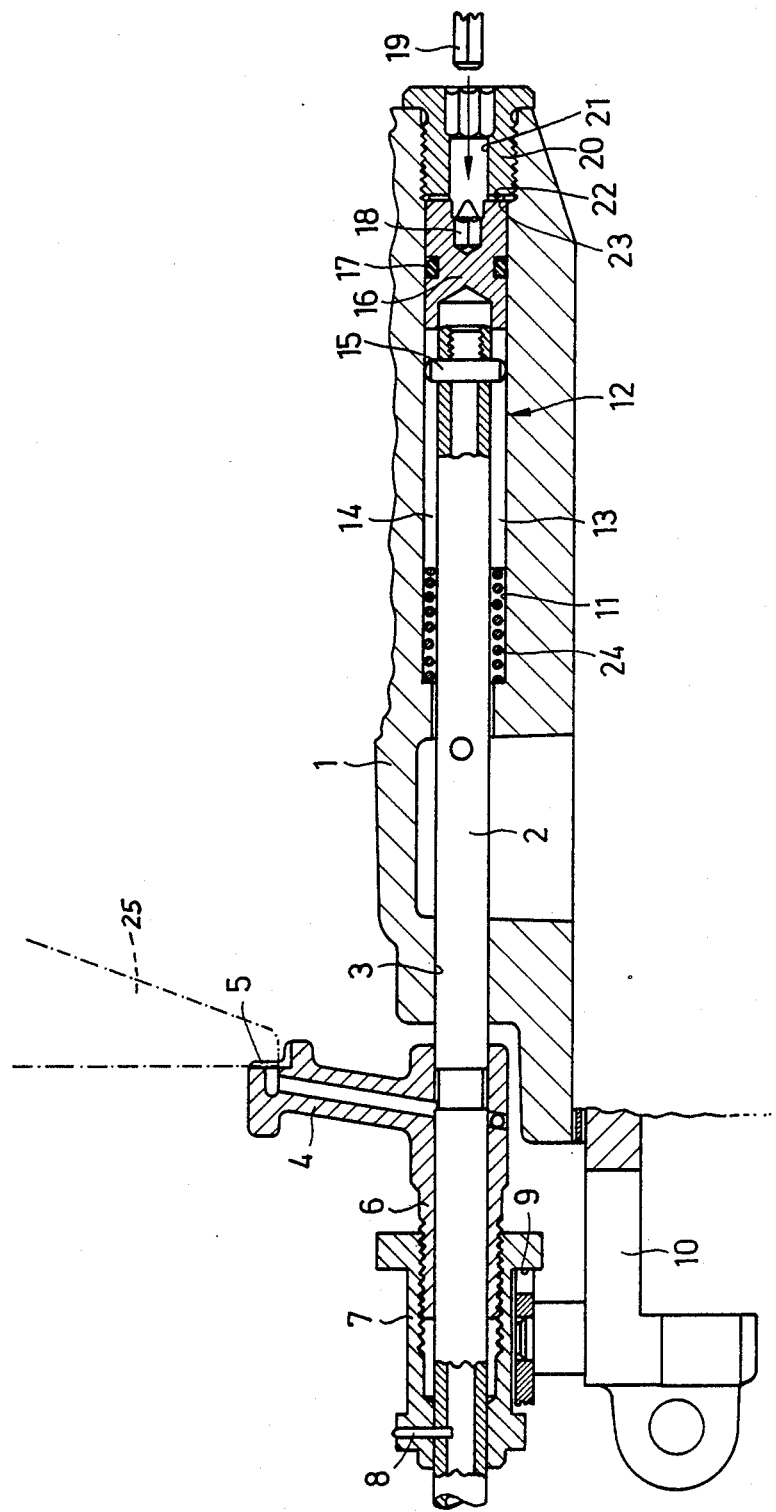

DEVICE FOR TRANSMITTING AN ADJUSTABLE POSITION OF A DRIVEBELT PULLEY IN A CONTINUALLY VARIABLE TRANSMISSION

BACKGROUND OF THE INVENTION

1. Field of the Invention

This invention relates to the field of continually variable automatic transmissions. More particularly, the invention pertains to a technique for adjustably transmitting the position of a pulley sensor to hydraulic valves that control operation of the transmission.

2. Description of the Prior Art

A device for adjusting the control input to a valve arrangement that produces fluid pressure as a function of position is known from European Patent Specification No. 0,158,370. There, a lever system transmits the position of a cone-pulley in a belt-driven transmission to the valve arrangement. The operating position of the pulley is set and adjusted by a setting thread located inside the levers.

This adjustment device has the disadvantage that, in order to change the operating position of the lever system, part of the lever system located inside the transmission or the valve body must be accessible to the operator making the adjustment by removal of the oil sump that supplies the valve body with oil.

Because of this, it is impossible to change the position of the lever system when the automatic transmission is in operation. This deficiency results in repeated setting procedures while the transmission is inoperative made on the basis of setting checks taken and recorded during its operation.

German Offenlegungsschrift No. 15 30 775 describes a setting device for a valve arrangement of an automatic transmission in which fluid pressure is produced as a function of position parameters. The operating position of the valve can be altered and set during operation of the transmission by a key or tool inserted from outside the transmission housing. In this way, the effect of the changed setting on transmission functions can be checked directly.

SUMMARY OF THE INVENTION

An object of the present invention is to provide an improved setting device for a continually variable belt-driven automatic transmission. Through operation of a device of this invention, continual changes in the position of a lever system that occur in normal operation have no effect on the adjustment device. Axial movements which occur during operation produce no undesired change in the setting made by an operator from outside the transmission housing. A sensor foot detects the position of a belt-driven pulley. The foot is displaceable on an axial guide rod by a threaded bushing having abutment surface contacted by the lever. The axial position of the bushing is adjusted from outside the transmission housing. A bore in the housing that receives and supports the guide rod has an enlarged portion that receives a slotted setting sleeve, connected rotatably rigidly with the guide rod but free to move axially with respect to the guide rod. The rotatable connection is made by a transverse pin located in longitudinal slots. The end of the bore is sealed by an O-ring and has a tool receiving socket on the end facing an end of the bore accessible from outside the transmission housing. The tool is inserted within the socket to facilitate turning the guide rod. Longitudinal slots in the setting sleeve permit unrestricted axial movement of the guide rod which occur normally during operation. The setting sleeve is preloaded axially outward at its inner end by a coiled helical spring. The receiving bore of the housing is closed by a safety plug threaded tightly on the housing. Both the end of the setting sleeve and the adjacent face of the safety plug are formed on mutually opposite faces with radial teeth. The tool displaces the setting sleeve when axial pressure is applied. After withdrawal of the tool, the radial teeth of the setting sleeve engage the radial teeth of the safety plug to prevent any change in the setting due to axial movement of the guide rod or driveline vibrations.

BRIEF DESCRIPTION OF THE DRAWING

The FIGURE is a cross section through a setting device in the vicinity of a sensor foot for detecting the location of a movable pulley engaging and supporting the drivebelt of a continually variable transmission.

DESCRIPTION OF THE PREFERRED EMBODIMENT

The housing 1 of a continually variable belt-drive transmission supports an axially displaceable guide rod 2 on a bore 3. A sensor foot 4, arranged axially variably on the guide rod, has an arcuate abutment edge 5 located for contact with the outer periphery of a cone pulley 25. The hub 6 of the sensor foot has an external screw thread, by which it is engaged with an internal thread on the threaded bushing 7, fixed by pin 8 to the guide rod against rotation. The bushing has a lever abutment surface 9 contacted by a lever system 10, whose other end acts in the conventional way on a valve.

The bore 3 in the housing for the guide rod is enlarged at 11 to accept a slotted setting sleeve 12. The sleeve has two diagonally opposite longitudinal slots 13, 14, by which it is connected by transverse pin 15 to the guide rod against rotation but is free to move axially along the guide rod. The setting sleeve 12 also includes a closed end 16 sealed by O-ring 17 on bore 11, and defining a receiving means or socket 18 into which tool 19 is inserted from outside the transmission housing.

The setting device is used to set the operative position of lever system 10 from outside the housing subject to the setting in an appropriate axial position of the setting sleeve.

During operation of the transmission as changes in the drive ratio continually occur, the axial position of the pulley continually change; therefore, guide rod 2 of the sensor foot continually changes its axial position. Oscillations and vibrations present in the drive system transmitted through the housing can lead to an undesired change in the setting of the operative position of the sensor foot.

To prevent this occurrence, the enlarged receiving bore 11 is closed by a safety plug 20 threaded onto the internal thread at the end of the bore 11. The plug has an opening 21 to receive the tool 19 therein and carries a radial tooth 22 located on its axially inner face. The outer end of setting sleeve 12 has a similar radial tooth 23. The setting sleeve is preloaded axially outward by helical spring 24 located in bore 11 between a shoulder formed on the housing and the inner end of sleeve 12.

In order to actuate the setting device, tool 19 is inserted through the safety plug, forced axially inward, and turned so that the mutually engaging radial teeth 22 and 23 disengage. Then, it is possible to turn setting sleeve 12 so that the position of the setting foot 4 can be changed relative to the abutment 9 of the lever system 10. When tool 19 is withdrawn, helical spring 24 forces the radial teeth 23 on the end of the setting tool 12 back into engagement with the radial teeth 22 on safety plug 20. Then, the operative position set during the adjustment is maintained and prevented from being changed by mistake or operating disturbance.

Having described the preferred embodiment of our invention, what we claim and desire to secure by U.S. Letters Patent is:

1. A device for adjusting the position of a system that transmits the position of a displaceable pulley located in an automatic transmission to a control element, comprising:
   a control lever;
   a guide rod supported for displacement along its axis and rotation about its axis;
   a sensor supported on the guide rod for axial displacement, located for contact with the pulley;
   a bushing having an surface adapted for contact with the control lever, connected to the guide rod for axial displacement and rotation therewith, engaged with the sensor so that the position of the sensor changes as the guide rod rotates;
   means for rotating the guide rod.

2. The device of claim 1 wherein the transmission includes a housing having a wall and wherein
   the guide rod is supported on the housing, and extends within the housing; and
   the rotating means is accessible from outside the transmission housing.

3. The device of claim 1 wherein the transmission includes a housing, further comprising a sleeve supported on the housing, rotatably connected to the guide rod, axially moveable with respect to the guide rod, having means for engaging and rotating the sleeve from outside the housing.

4. The device of claim 3 wherein the sleeve surrounds the guide rod, the sleeve further comprises a longitudinal directed slot, an annular recess located on the surface of the sleeve facing the housing, and further . comprising:
   an O-ring seal located in the recess; and
   a pin located within the slot, rotatably connecting the sleeve and guide rod, and allowing axial displacement of the guide rod relative to the sleeve.

5. The device of claim 3, further comprising:
   a tooth carried on the sleeve;
   a plug, supported on the housing, aligned with the sleeve, having an access hole through which the sleeve can be reached and rotated from outside the housing, and a tooth engageable with the tooth of the sleeve; and
   a spring urging the teeth axially toward engagement.

6. A device for adjusting a system that indicates the position of a displaceable pulley located in an automatic transmission housing, comprising:
   means responsive to the position of the pulley for moving in accordance therewith;
   means for adjusting from outside the transmission housing the position of the moving means with respect to the position of the pulley; and
   means contacting the adjusting means for indicating the position of the pulley.

7. A device for adjusting a system that indicates the longitudinal position of a displaceable pulley located in an automatic transmission housing, comprising:
   means responsive to the position of the pulley for movement longitudinally in accordance therewith;
   means for adjusting the longitudinal position of the moving means with respect to the position of the pulley by rotating said adjusting means from outside the transmission housing; and
   means responsive to the position of the adjusting means for indicating the position of the pulley.

* * * * *